United States Patent [19]

Yoneoka et al.

[11] Patent Number: 4,913,842
[45] Date of Patent: Apr. 3, 1990

[54] STEAM REFORMING OF METHANOL

[75] Inventors: Mikio Yoneoka; Tomiyoshi Furuta; Yasuo Yamamoto; Sadao Nozaki; Kazuo Takada; Kumiko Watabe; Takeo Ikarashi, all of Niigata, Japan

[73] Assignee: Mitsubishi Gas Chemical Company, Inc., Tokyo, Japan

[21] Appl. No.: 579,952

[22] Filed: Feb. 14, 1984

[30] Foreign Application Priority Data

Feb. 14, 1983 [JP] Japan ................................. 58-22493

[51] Int. Cl.$^4$ ............................................... C01B 3/38
[52] U.S. Cl. ................................................... 252/373
[58] Field of Search ............... 252/373; 502/307, 313, 502/318, 319

[56] References Cited

U.S. PATENT DOCUMENTS 3,515,514 6/1970 Holmes et al. ...................... 252/373
4,110,256 8/1978 Takeuchi et al. ................... 252/373
4,175,115 11/1979 Ball et al. ............................ 252/373

Primary Examiner—Bruce Gray
Attorney, Agent, or Firm—Robbins & Laramie

[57] ABSTRACT

A condensed liquid obtained after separation of gaseous components from the gas produced by the steam reforming reaction of methanol is brought into contact, in a gaseous phase, with catalyst (I) containing copper oxide (A), oxide of at least one type of metals selected from the group consisting of zinc, aluminium and chromium (B) and oxide of the group VIII metal in the periodic table (C), or catalyst (II) comprising the group VIII metal in the periodic table or compound thereof supported on carriers.

The treatment of the condensed liquid yields water containing substantially no methanol, ethanol and high boiling point components. The treated condensed liquid causes no pollution problem when disposed as effluent and may be reused for the steam reforming reaction of methanol.

15 Claims, 3 Drawing Sheets

STEAM REFORMING OF METHANOL

BACKGROUND OF THE INVENTION

1. Field of the Invention

This invention relates to a process for the stream reforming of methanol, and particularly to a process for producing a reformed gas containing hydrogen gas and carbon dioxide gas in a good efficiency by vapor phase reaction of methanol and water in the presence of catalysts.

2. Description of the Prior Arts

Hydrogen gas is used in many industries. For instance, it is extensively used in ammonia synthesis, hydrogenation of various types of organic compounds, oil refining and desulfurization, etc. Also, it has a great demand for the metallurgical industry and the semiconductor industry.

Furthermore, hydrogen gas is expected to be a new energy source accompanying a recent advance in the fuel battery technologies. Thus, the demand for hydrogen gas has increasingly expanded.

Conventional methods for the production of hydrogen gas include steam reforming of hydrocarbons such as liquefied petroleum gas (LPG), liquefied natural gas (LNG) and naphtha. According to the usual method, carbon monoxide and carbon dioxide are removed from a reformed gas containing hydrogen gas, carbon monoxide and carbon dioxide obtained by the above methods so as to produce hydrogen gas. The conventional methods have several drawbacks in that (1) the price of the raw material hydrocarbons continues to rise after the oil shock, and the supply of the raw material hydrocarbons is in unstable conditions, (2) desulfurization of the raw materials is required, (3) a high reaction temperature of 800°–1,000° C. is required for steam reforming, etc. Thus, the conventional methods are suitable for large scale hydrogen gas production, but they are not adequate for middle to small scale hydrogen gas production.

In contrast, hydrogen gas production by the steam reforming of methanol has various advantages in that (1) the reaction temperature is relatively low, (2) separation of hydrogen gas from the reformed gas is easy, (3) no desulfurization is required because methanol is the raw material, etc. Also, the method can easily cope with large to small scale plants, since it uses inexpensive and easily transportable methanol as the raw material.

The steam reforming reaction of methanol ($CH_3OH + H_2O \rightarrow 3H_2 + CO_2$) itself has long been known, and some patents relating to the reaction are made open. In general, the reaction is carried out by adopting the molar ratio of water to methanol at 1.0 or more. The reaction yields a wet gas (hereinafter referred to as wet gas) containing condensable components such as methanol and water, and a reformed gas. After the reaction, the reformed gas containing hydrogen and carbon dioxide is taken out by cooling of the wet gas. Here, an industrial problem is the treatment of the condensed liquid. Conventionally, the condensed liquid is disposed without treatment as in FIG. 5, or the condensed liquid obtained by vapor-liquid separation treatment is recycled to the reaction system as in FIG. 6 so as to make reuse of the condensed liquid together with the raw material methanol and water. However, the former has a big problem from the view-point of pollution since the condensed liquid contains a considerable amount of organic components such as unreacted methanol and high boiling point components. In the latter, a trace amount of ethanol contained in the raw material methanol accumulates because it is hardly converted by the usual reaction method.

SUMMARY OF THE INVENTION

It is an object of the invention to provide a method of steam reforming of methanol in which organic components are substantially removed from the condensed liquid obtained by separation of gaseous components from the produced gas in the steam reforming reaction of methanol so as to dispose waste water free from pollution.

It is another object of the invention to provide a method of steam reforming of methanol in which organic components are substantially removed from the condensed liquid obtained by the separation of gaseous components from the produced gas in the steam reforming reaction of methanol so as to make reuse of condensed liquid obtained in the system.

A further object of the invention is to provide a method of steam reforming of methanol which requires no specific and complex waste water treatment for the condensed liquid obtained by the separation of gaseous components from the produced gas in the steam reforming reaction of methanol.

The inventors of the invention who made detailed studies in view of the above objects have found that an increase in ethanol content negatively affects the rate of reaction in the steam reforming reaction of methanol, and it gives a bad effect even in small amounts. Thus, the inventors found that the conversion of methanol considerably decreases if ethanol is accumulated, and this greatly lowers the advantage of the recycling process.

The inventors also carried out earnest investigations on how to make the condensed liquid obtained by the steam reforming reaction of methanol pollution-free or harmless to reuse. As a result, the inventors found excellent catalysts for treating the condensed liquid, and completed the invention.

That is, the invention provides a steam reforming method of methanol wherein a reformed gas containing hydrogen gas and carbon dioxide gas is obtained by gaseous phase reaction of methanol and water in the presence of catalysts, characterized in that the condensed liquid obtained after separation of gaseous components from the gas produced by the steam reforming reaction of methanol or a mixture of the condensed liquid with water is brought into contact with those catalysts (I) containing copper oxide (A), oxide of at least one type of metals selected from the group consisting of zinc, aluminum and chromium (B) and oxide of the group VIII metal in the periodic table (C), or those catalysts (II) comprising the group VIII metals in the periodic table supported on carriers.

DETAILED DESCRIPTION OF THE INVENTION

In the invention, for example, the following catalysts are used for the catalytic treatment of a wet gas discharged from the reactor for the steam reforming methanol. The catalytic treatment is applied to the condensed liquid in the gaseous phase after separation of a formed gas by cooling.

That is, those catalysts (I) containing, as active component, copper oxide (A), oxide of at least one type of metal selected from the group consisting of zinc, aluminium and chromium (B) and oxide of the group VIII metals in the periodic table (C) are used. Of these, such combinations as copper oxide-zinc oxide-aluminum oxide, copper oxide-zinc oxide and copper oxide-zinc oxide-chromium oxide to each of which one or more types of oxide of cobalt, platinum and palladium are added should preferably be used. Alternatively, those catalysts (II) which comprise supporting compounds of the group VIII metals in the periodic table such as oxides, hydroxides, ammonium salts, sulfates, hydrochlorides, phosphates, carbonates, nitrates and other inorganic acid salts, formates, acetates, oxallates and other organic acid salts, and complexes, such as carbonyl of the group VIII metals in the periodic table on usual carriers such as active carbon, brick, pumice, diatomaceous earth, alumina, silica, a silica/alumina mixture, titania, zirconia, natural and synthetic zeolite, etc. are used. Of these, such catalysts as nickel, cobalt, platinum or palladium metals or compounds there of supported on active carbon, brick, diatomaceous earth or zeolite should preferably be used. In the above catalysts, the compounds of metals are more desirable than the simple metals.

The catalysts (I) should contain in atomic ratio 1 copper, 0.2–2 and preferably 0.3–1.5 zinc and chromium respectively, 0.01–1.5 and preferably 0.04–1 aluminium, and 0.01–3 and preferably 0.05–2 group VIII metals. Also, the catalysts (II) should contain 0.01–50 parts by weight and preferably 0.05–30 parts by weight of metals or compounds thereof per 100 parts by weight of carriers.

In the invention, the process for the preparation of catalysts should not particularly be limited, and the catalysts may only contain the oxides, the compounds or the simple metals each at the beforementioned ratios. Usual methods for the preparation of catalysts (I) include, for example, (1) a method of homogeneously mixing powder oxides which have separately been prepared, (2) a method of yielding a mixture of oxides wherein alkali carbonates or alkali bicarbonates are added to an aqueous mixture of water-soluble salts so as to cause coprecipitation and then the coprecipitate is followed by calcinating in the air, and (3) a method of yielding a mixture of oxides wherein a portion of metal oxides are added to a portion of metal coprecipitates before calcinating. Also, conventional methods are used for the preparation of catalysts (II). For example, the catalysts (II) are prepared by immersing the carriers in an aqueous solution of the metal compounds followed by drying or calcinating. The purity of the compounds should not particularly be limited, and reagents of 1st grade to industrial chemicals may arbitrarily be used.

These catalysts are previously heated for reduction at 150°–400° C. in a reducing gas atmosphere such as hydrogen gas, carbon monoxide gas or a mixture thereof to activate the catalysts, or the heated catalysts are brought into contact with methanol or a mixture of methanol and water so as to reduce the catalysts for activation by use of reducing gas such as hydrogen gas or carbon monoxide gas produced by decomposition of methanol.

In the invention, the vaporized gas of the condensed liquid should be treated at 150°–600° C. and preferably 200°–450° C. and at a pressure of 50 kg/cm$^2$G or less and preferably normal pressure to 30 kg/cm$^2$G. The space velocity of the vapor should be 50–50,000 h$^{-1}$ and preferably 100–30,000 h$^{-1}$. If required, 0.01–100 parts by weight of water may be added to 1 part by weight of the condensed liquid before treatment.

The condensed liquid thus treated is water containing almost no organic components, and so, it causes no pollution problem if disposed as effluent. The treated condensed liquid may also be reused for the steam reforming reaction of methanol by combination with raw material methanol or a mixture of raw material methanol and water, and the reuse is preferable.

If the treated condensed liquid is reused in the reforming reaction system, it is necessary to adjust the amount of water so as to make the methanol/water ratio at a predetermined value. Therefore, if steam reforming of methanol is continuously carried out, a portion or the whole of a predetermined amount of raw material water may be alloted for water to be added to the condensed liquid. The steam reforming reaction of methanol which discharges the condensed liquid or makes reuse of the treated condensed liquid should not particularly be limited, but the reaction is usually carried out as follows.

Known catalysts are used for the steam reforming reaction of methanol. For example, they include copper catalysts such as those containing copper oxides, chromium oxides and manganese oxides (Japanese Patent Publication No. 54-11274), those containing copper, zinc and aluminum (Japanese Laid-Open Patent No. 49-47281), those containing oxides of copper, zinc, aluminium and thorium (U.S. Pat. No. 4,091,086) and those containing oxides of copper, zinc, aluminium, and chromium, and those containing oxides of nickel and aluminium (Japanese Laid-Open Patent No. 57-56302); and the group VIII metal catalysts such as nickel, cobalt, iron, ruthenium, rhodium, platinum or palladium supported on alumina (Nenyo Kyokai-shi vol. 59, pp 40–47 (1980) and a catalysts of palladium supported on alumina (Dutch patent application Nos. 6,414,748 and 6,414,753). Also, those catalysts containing as active component copper oxides, zinc oxides, aluminium oxides and manganese oxides and/or boron oxides which are found by the inventors may suitably be used. It is a matter of course that the catalysts are activated by reduction.

The conditions of steam reforming reaction of methanol vary with the catalysts used, and cannot absolutely be specified. However, the usual conditions are as follows. The reaction temperature should be 150°–400° C. and preferably 180°–350° C., the ratio of water to methanol should be 1–50 moles and preferably 1–20 moles of water per mole of methanol, the space velocity of vapor should be 50–50,000 h$^{-1}$ and preferably 100–15,000 h$^{-1}$, and the reaction pressure should be 50 kg/cm$^2$G or less and preferably atmospheric pressure to 30 kg/cm$^2$G. If required, hydrogen gas, carbon monoxide gas, carbon dioxide gas or inert gases such as nitrogen gas may be added in amounts about 0.1–5 moles per mole of methanol before reaction.

The reformed gas obtained by the invention mainly contain hydrogen gas and carbon dioxide gas. When carbon dioxide gas is removed from the reformed gas by a conventional method such as absorptive removal with an aqueous sodium carbonate solution, an aqueous potassium carbonate solution or an aqueous monoethanolamine solution, a high purity of hydrogen gas is obtained.

Also, when the condensed liquid is reused after treatment for the steam reforming reaction of methanol, it has no bad effect due to ethanol and/or high boiling point components on the reaction. The conversion of methanol is usually maintained high, and the durability of catalysts is increased, and the process causes no pollution. Thus, the method of the invention has a greatly increased industrial value.

The invention will be described in further detail with reference to the following examples.

Catalysts for treating condensed liquid used in the Examples and the Comparative Examples were produced in accordance with the following methods.

PREPARATION METHOD A

An aqueous solution, in which water-soluble salt or salts shown in Table except aluminium were dissolved in water, and an aqueous solution of alkali carbonate were heated to 73° C., respectively, and satisfactorily agitated for mixing, to produce a co-precipitate. This co-precipitate was separated by filtering, washed and mixed with alumina sol at a predetermined wt %. A mixture having a predetermined composition thus obtained was dried at 75° C., and further, calcinated at 400° C. in the air stream. The thus calcinated matter was granulated into tablets.

PREPARATION METHOD B

An aqueous solution, in which all of the water-soluble salts shown in Table, and an aqueous solution of alkali carbonate were heated to 73° C., respectively, and satisfactorily agitated for mixing, to produce a co-precipitate. This co-precipitate was separated by filtering, washed, dried at 75° C. and calcinated at 400° C. in the air stream. The thus calcinated matter was granulated into tablets.

PREPARATION METHOD C

Metallic oxides being at a predetermined compositional ratio were uniformly mixed. The mixture thus obtained was dried at 70° C., calcinated at 400° C. in the air stream, and thereafter granulated into tablets.

PREPARATION METHOD D

A carrier was immersed in an aqueous solution of metallic compound having predetermined concentrations, respectively, as shown in Table, thereafter, most of moisture was evaporated therefrom under a reduced pressure, subsequently, dried at 75° C. and calcinated at 400° C.

PREPARATION METHOD E

The entirely same process was adopted as in the Preparation method D except calcination at 400° C. was not carried out.

| Example | Catalyst used for treatment of this invention (in atomic ratio) | Preparation method | Materials | | | |
|---|---|---|---|---|---|---|
| 1 | CuO—ZnO—Al$_2$O$_3$—NiO (1:0.75:0.25:0.125) | A | Cu(NO$_3$)$_2$ | Zn(NO$_3$)$_2$ | Ni(NO$_3$)$_2$ | alumina sol |
| 2 | PtO$_2$ (2 wt %) supported on active carbon | D | H$_2$PtCl$_6$ | active carbon | — | — |
| 3 | CuO—ZnO—Al$_2$O$_3$—NiO (1:0.75:0.25:0.125) | A | Cu(NO$_3$)$_2$ | Zn(NO$_3$)$_2$ | Ni(NO$_3$)$_2$ | alumina sol |
| 4 | Cu—ZnO—Al$_2$O$_3$—NiO (1:0.75:0.25:0.125) | A | Cu(NO$_3$)$_2$ | Zn(NO$_3$)$_2$ | Ni(NO$_3$)$_2$ | alumina sol |
| 5 | diatomaceous earth supporting a 20 wt % of NiO | D | NiC$_2$O$_4$ | diatomaceous earth | — | — |
| 6 | CuO—ZnO—Al$_2$O$_3$—CoO (1:0.75:0.25:0.125) | A | Cu(NO$_3$)$_2$ | Zn(NO$_3$)$_2$ | Co(CH$_3$COO)$_2$ | alumina sol |
| 7 | CuO—ZnO—NiO (1:1:1) | B | Cu(NO$_3$)$_2$ | Zn(NO$_3$)$_2$ | Ni(NO$_3$)$_2$ | — |
| 8 | CuO—ZnO—Cr$_2$O$_3$—PtO$_2$ (1:0.75:0.5:0.05) | B | CuC$_2$O$_4$ | ZnC$_2$O$_4$ | Cr(NO$_3$)$_3$ | H$_2$PtCl$_6$ |
| 9 | CuO—Cr$_2$O$_3$—OsO$_4$ (1:0.5:0.15) | C | CuO | Cr$_2$O$_3$ | OsO$_4$ | — |
| 10 | CuO—Al$_2$O$_3$—RuO$_2$ (1:0.1:0.05) | B | Cu(NO$_3$)$_2$ | NaAlO$_2$ | RuCl$_3$ | — |
| 11 | Active carbon supporting 5 wt % of Pd(CH$_3$COO)$_2$ | E | Pd(CH$_3$COO)$_2$ | active carbon | — | — |
| 12 | Zeolite supporting 1 wt % of Rh(NO$_3$)$_2$ | E | Rh(NO$_3$)$_2$ | Zeolite | — | — |
| 13 | CuO—ZnO—Al$_2$O$_3$—NiO (1:1:0.5:0.5) | A | Cu(NO$_3$)$_2$ | Zn(NO$_3$)$_2$ | Ni(NO$_3$)$_2$ | alumina sol |
| 14 | CuO—ZnO—Al$_2$O$_3$—NiO (1:1.5:0.7:1.0) | A | CuC$_2$O$_4$ | ZnC$_2$O$_4$ | NiC$_2$O$_4$ | alumina sol |
| 15 | CuO—ZnO—Al$_2$O$_3$—NiO (1:0.5:0.35:0.2) | A | Cu(NO$_3$)$_2$ | Zn(NO$_3$)$_2$ | Ni(NO$_3$)$_2$ | alumina sol |

EXAMPLE 1

Figure 1:
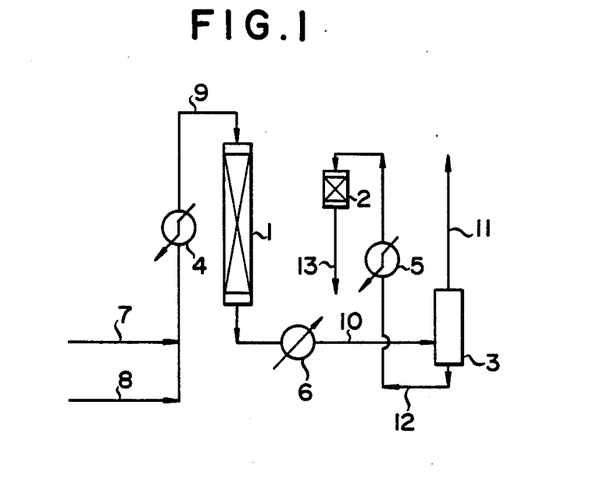
FIG. 1 to FIG. 4 show typical examples of process flow for carrying out the steam reforming reaction of methanol by the present invention.

According to the process flow shown in FIG. 1, the following operations were carried out.

10 l of a CuO-ZnO-Al$_2$O$_3$-B$_2$O$_3$ catalyst (1:0.75:0.1:0.013 in atomic ratio, preparation method A) was charged into a reactor (1) as a catalyst for use in the steam reforming of methanol. Also, 2.5 l of a CuO-ZnO-Al$_2$O$_3$-NiO catalyst (1:0.75:0.25:0.125 in atomic ratio) was charged into a reactor (2) as a catalyst for use in the treatment of condensed liquid. Then, steam containing 5 vol % of H$_2$ gas was passed through the catalyst layers at 200° C. for 12 hrs to carry out reduction of the catalysts. After termination of catalyst reduction, methanol containing 0.0045 wt % of ethanol was supplied at a velocity of 8.68 kg/h through a line (7), and H$_2$O was supplied at a velocity of 9.77 kg/h through a line (8) to an evaporator (4), and both were fed in a gaseous form into the reactor (1). The steam reforming reaction was carried out in the reactor (1) in such conditions as a pressure of 10 kg/cm$^2$G, a temperature of 265° C., a water/methanol ratio (at the inlet of the reactor, the same will apply thereinafter) of 2.0 and a vapor space velocity (at the inlet of the reactor, the same will apply hereinafter) of 1,821 h$^{-1}$. Then, 99.0% of methanol supplied into the reactor (1) was converted. Wet gas from the reactor (1) was cooled in a condenser (6), and was separated into a reformed gas and a condensed liquid in a vapor-liquid separator (3). The reformed gas was taken out through a line (11), and the condensed liquid was taken out through a line (12), respectively. Here, the amount of the reformed gas taken out was 23.88 Nm$^3$/h, and the composition was 74.84 vol % of H$_2$, 23.45 vol % of CO$_2$, 0.81 vol % of CO and trace amounts of CH$_4$.

Next, 5.02 kg/h of the condensed liquid recovered was evaporated in an evaporator (5), and was introduced into a reactor (2) for treatment. The treatment was carried out in the reactor (2) at 325° C. and 10 kg/cm$^2$G and a vapor space velocity of 2,400 h$^{-1}$. The liquid discharged through a line (13) was substantially water alone, containing substantially no methanol, ethanol and high boiling point components.

COMPARATIVE EXAMPLE 1

Figure 5:
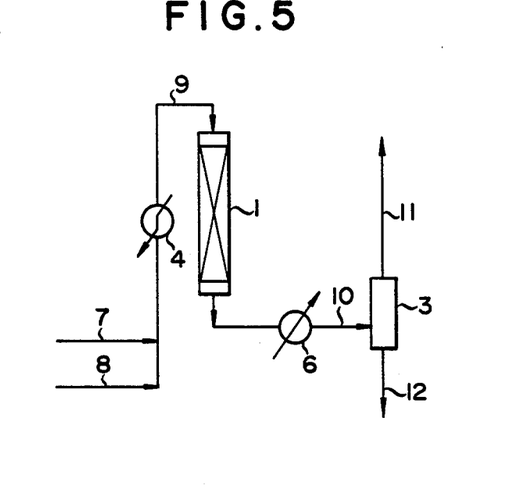
FIG. 5 and FIG. 6 show examples of conventional process flow.

According to a conventional process flow shown in FIG. 5, the operations were carried out. The process flow sheet in FIG. 5 is different from that in FIG. 1 in that the condensed liquid from the vapor-liquid separator (3) is disposed without any treatment. The steam reforming reaction of methanol in the reactor (1) was carried out in the same manner as in Example 1. The condensed liquid (5.02 kg/h) discharged from the vapor-liquid separator (3) contained 1.73 wt % of methanol, 0.0078 wt % of ethanol and 0.001 wt % of high boiling point components, the rest being water.

EXAMPLE 2

According to the process flow sheet in FIG. 1, the operations were carried out. 10 l of a CuO-ZnO-Al$_2$O$_3$-B$_2$O$_3$ catalyst as similar as in Example 1 was charged into the reactor (1), and 3 l of a catalyst of PtO$_2$ (2 wt %) supported on active carbon was charged into the reactor (2). Reduction of the catalysts was carried out in the reactors each with a steam flow containing 5 vol % of H$_2$ gas at 200° C. for 12 hrs. Methanol containing 0.080 wt % of ethanol was fed through the line (7) at a velocity of 8.52 kg/h, and H$_2$O was fed through the line (8) at a velocity of 9.58 kg/h to the evaporator (4), and a methanol-water mixed vapor was supplied into the reactor (1). The reactor (1) was operated at a pressure of 10 kg/cm$^2$G, a temperature of 265° C., a water/methanol ratio of 2.0 and a vapor space velocity of 1,787 h$^{-1}$. As a result, 90.6% of methanol supplied was converted. The reformed gas taken out through the line (11) was 21.47 Nm$^3$/h, with a composition of 74.87 vol % of H$_2$, 24.43 vol % of CO$_2$, 0.70 vol % of CO and trace amounts of CH$_4$. The condensed liquid was fed through the line (12) into the evaporator (5), and the vapor was supplied into the reactor (2). In the reactor (2) treatment was carried out at a pressure of 10 kg/cm$^2$G, a temperature of 361° C. and a vapor space velocity of 2,300 h$^{-1}$. The liquid discharged through the line (13) was substantially water, and the presence of methanol, ethanol and high boiling point components was substantially not noted.

COMPARATIVE EXAMPLE 2

According to the process flow sheet in FIG. 5, the steam reforming reaction of methanol was carried out in a manner similar to that in Example 2, except the condensed liquid was not treated. The condensed liquid discharged through the line (12) contained 13.23 wt % of unreacted methanol, 0.090 wt % of ethanol and 0.0098 wt % of high boiling point components, and the rest was water.

EXAMPLE 3

Figure 2:
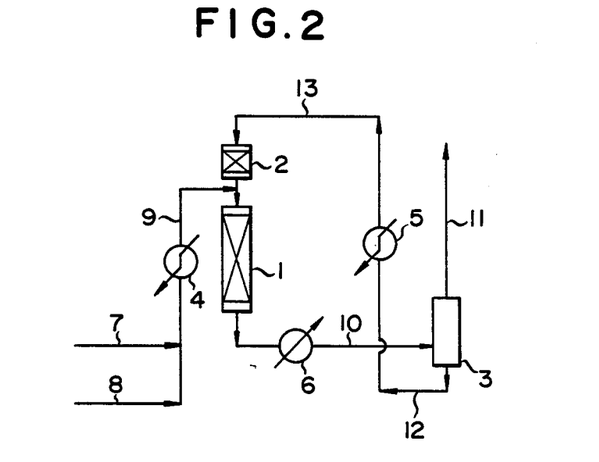

According to the recycle process in FIG. 2, the operations were carried out. 2 l of a CuO-ZnO-Al$_2$O$_3$-NiO catalyst (1:0.75:0.25:0.125 in atomic ratio) was charged into a reactor (2), and 10 l of a CuO-ZnO-Al$_2$O$_3$ catalyst (1:0.4:0.2 in atomic ratio, preparation method B) was charged into a reactor (1). Reduction of the catalysts each was carried out with N$_2$ gas containing 5 vol % of H$_2$ gas at 200° C. for 8 hrs. Then, methanol containing 0.0051 wt % of ethanol was fed at a velocity of 8.61 kg/h through a line (7) into an evaporator (4), and H$_2$O was fed at a velocity of 4.84 kg/h through a line (8) into the evaporator (4). A mixed vapor of methanol and water evaporated in the evaporator (4) was introduced with a wet gas from the reactor (2) into the reactor (1). In the reactor (1), the reaction was carried out at a pressure of 10 kg/cm$^2$G, a temperature of 265° C., a vapor space velocity of 1,800 h$^{-1}$ and a water/methanol ratio (molar ratio) of 2.0. The wet gas from the reactor (1) was cooled in a condenser (6), and was separated into a reformed gas and a condensed liquid. The condensed liquid (4.96 kg/h) was sent through a line (12) into an evaporator (5) for evaporation, and the vapor was fed into the reactor (2). In the reactor (2), treatment was carried out at a pressure of 10 kg/cm$^2$G, a temperature of 350° C. and a vapor space velocity of 3,000 h$^{-1}$. The wet gas from the reactor (2) was introduced with raw material vapor of methanol and water into the reactor (1) for use in the steam reforming reaction of methanol. The above recycle process was operated continuously for a long time in a stationary state. In the stationary state, the conversion of methanol supplied into the reactor (1) was 99.1% and the amount of reformed gas taken out through the line (11) was 24.04 Nm$^3$/h. The composition of the reformed gas was 74.84 vol % of H$_2$, 24.32 vol % of CO$_2$, 0.83 vol % of CO and 0.01 vol % of CH$_4$. Also, the wet gas from the reactor (2) substantially contained no methanol, ethanol and high boiling point components.

COMPARATIVE EXAMPLE 3

Figure 6:
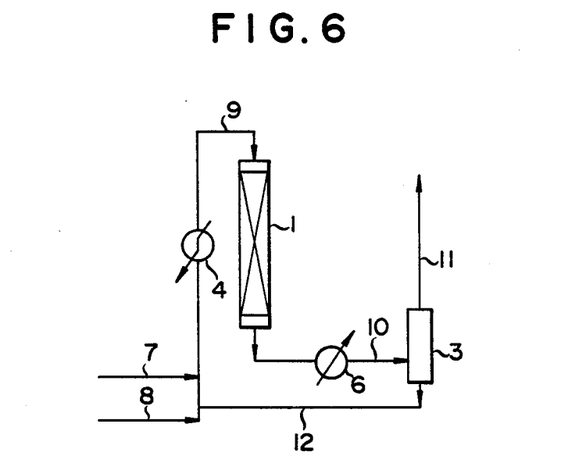

According to a conventional recycle process involving no condensed liquid-treating process as in FIG. 6, the steam reforming reaction of methanol was carried out in a manner completely similar to that in Example 3. The condensed liquid was sent with raw material methanol and water into a reactor (1) without receiving any treatment. Accompanying the progress of the operation, the contents of methanol, ethanol and other high boiling point components increased and reached constant values. In a stationary state, the conversion of methanol supplied into the reactor (1) was 86.7%, and the amount of reformed gas was 20.36 Nm$^3$/h. The composition of the reformed gas was 74.38 vol % of $H_2$, 25.02 vol % of $CO_2$, 0.60 vol % of CO and traces of $CH_4$. The ethanol content of the condensed liquid was 0.0684 wt %.

EXAMPLE 4

The operations were carried out in a manner similar to those in Example 3, except methanol containing 0.081 wt % of ethanol was used as raw material methanol and the reaction was carried out at 340° C. and at a vapor space velocity of 2,000 h$^{-1}$ in the reactor (2). The conversion of methanol supplied into the reactor (1) was 90.6%. The amount of reformed gas was 24.06 Nm$^3$/h. The composition of the reformed gas was 74.86 vol % of $H_2$, 24.37 vol % of $CO_2$, 0.77 vol % of CO and 0.02 vol % of $CH_4$. Also, the wet gas from the reactor (2) substantially contained no methanol ethanol and high boiling point components.

COMPARATIVE EXAMPLE 4

According to a conventional process shown in FIG. 6, the operations were carried out in a manner similar to the steam reforming reaction of methanol in Example 4. In a stationary state, the conversion of methanol supplied into the reactor (1) was 62.1% and the amount of reformed gas was 14.76 Nm$^3$/h. The reformed gas composition was 74.56 vol % of $H_2$, 25.00 vol % of $CO_2$, 0.44 vol % of CO and traces of $CH_4$. Also, 0.263 wt % of ethanol and 0.109 wt % of high boiling point components were present in the condensed liquid.

EXAMPLE 5

Figure 3:
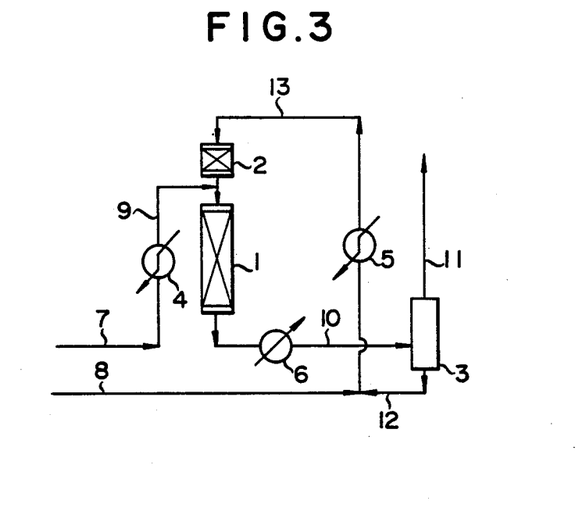

According to a process flow sheet shown in FIG. 3, the operations were carried out. 3 ml of a catalyst which comprises diatomaceous earth supporting a 20 wt % of NiO was charged in a reactor (2), and 10 ml of a CuO-ZnO-$Al_2O_3$ catalyst (1.0:0:0.75:0.25 in atomic ratio, preparation method B) was charged in a reactor (1). These catalysts were reduced by use of a $N_2$—$H_2$ mixed gas. Methanol containing 0.0396 wt % of ethanol was supplied at a velocity of 6.86 g/h through a line (7). Methanol vapor was fed by pressure with the wet gas from the reactor (2) into the reactor (1). In the reactor (1), the operations were carried out at a pressure of 15 kg/cm$^2$G and a temperature of 265° C., and the vapor space velocity was controlled at 1,400 h$^{-1}$ and the water/methanol ratio was 2.0. The wet gas from the reactor (1) was cooled in a condenser (6), and was separated into a reformed gas and a condensed liquid in a vapor-liquid separator (3). The condensed liquid was sent with $H_2O$ (3.76 g/h) newly supplied through a line (8) into an evaporator (5), and the vapor was introduced into the reactor (2) through a line (13). In the reactor (2), the operating conditions were a pressure of 15 kg/cm$^2$G, a temperature of 280° C. and a vapor space velocity of 3,270 h$^{-1}$. In a stationary state, the amount of reformed gas was 18.45 Nl/h, and the gas composition was 74.75 vol % of $H_2$, 24.37 vol % of $CO_2$, 0.87 vol % of CO and 0.01 vol % of $CH_4$. The conversion of methanol supplied into the reactor (1) was 95.2%. Also, substantially no ethanol or high boiling point components were present in the wet gas from the reactor (2), and the wet gas substantially consists of water.

COMPARATIVE EXAMPLE 5

According to a process flow sheet in FIG. 6, the steam reforming reaction of methanol was carried out in a manner similar to that in the reactor (1) of Example 5. In a stationary state, the conversion of methanol supplied into the reactor (1) was 70.5%. The amount of reformed gas generated was 12.88 Nl/h. The composition of reformed gas was 74.62 vol % of $H_2$, 24.98 vol % of $CO_2$, 0.52 vol % of CO and traces of $CH_4$. Also, 0.141 wt % of ethanol and 0.064 wt % of high boiling point components were present in the recycling condensed liquid.

EXAMPLE 6

Figure 4:
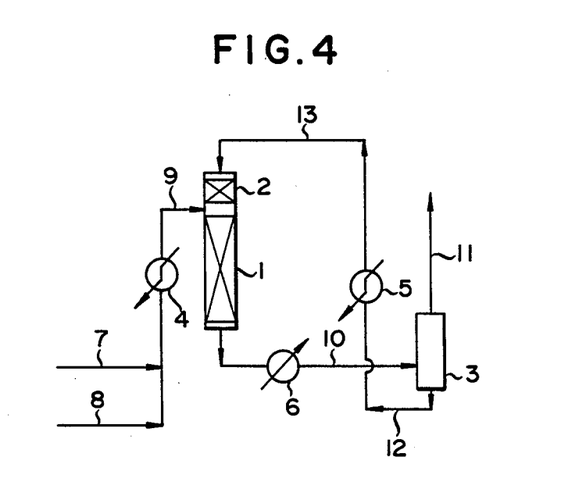

According to the process flow sheet in FIG. 4, the operations were carried out. In FIG. 4, a reactor (1) and a reactor (2) are vertically connected in a body with a gap, and raw material methanol and water are supplied from above the reactor (1). Into the reactor (2), 2.5 ml of a CuO-ZnO-$Al_2O_3$ CoO catalyst (1:0.75:0.25:0.125 in atomic ratio) was charged, and 10 ml of a CuO-ZnO-$Cr_2O_3$ catalyst (1.0:1.0:0.5 in atomic ratio preparation method B) described in Japanese Patent Publication No. 49-37708 was charged in the reactor (1). After reduction of the catalysts, methanol containing 0.0048 wt % of ethanol was fed at a velocity of 6.69 g/h through a line 7 into an evaporator (4), and water was also fed at a velocity of 3.77 g/h through a line (8) into the evaporator (4). The methanol/water mixed gas generated in the evaporator (4) was supplied from upward with the gas from the reactor (2) into the reactor (1). The wet gas discharged from the reactor (1) was cooled in a condenser (6), and was separated into a reformed gas and a condensed liquid in a vapor-liquid separator (3). The reformed gas was taken out through a line (11). The condensed liquid taken out from the vapor-liquid separator through a line (12) was sent into an evaporator (5), and the vapor generated was introduced into the reactor (2). The reactor (1) was operated at atmospheric pressure and at 340° C. The vapor space velocity was 1,400 h$^{-1}$, and the water/methanol ratio was 2.0. The reactor (2) was operated at atmospheric pressure at 340° C., and the space velocity of the gas passing was 1,900 h$^{-1}$. In a stationary state, the reformed gas taken out was 18.51 Nl/h in amounts, and composed of 74.71 vol % $H_2$, 24.13 vol % $CO_2$, 1.12 vol % CO and 0.02 vol % $CH_4$.

EXAMPLE 7-12

The operations were carried out in a manner similar to those in Example 5, except the temperature of catalyst was varied in the reactor (2).

| Example | Temp. in reactor 2 (°C.) | Methanol conversion in reactor 1 (%) | Reformed gas Amount generated (Nl/h) | $H_2$ | $CO_2$ | CO | $CH_4$ |
|---|---|---|---|---|---|---|---|
| 7 | 265 | 94.8 | 18.47 | 74.77 | 24.69 | 0.53 | 0.01 |
| 8 | 300 | 93.5 | 18.46 | 74.76 | 24.37 | 0.86 | 0.01 |
| 9 | 350 | 93.6 | 18.47 | 74.62 | 24.41 | 0.95 | 0.02 |

-continued

| Example | Temp. in reactor 2 (°C.) | Methanol conversion in reactor 1 (%) | Reformed gas Amount generated (Nl/h) | Composition (vol %) $H_2$ | $CO_2$ | CO | $CH_4$ |
|---|---|---|---|---|---|---|---|
| 10 | 340 | 94.5 | 18.61 | 74.84 | 24.72 | 0.42 | 0.02 |
| 11 | 290 | 96.2 | 18.69 | 74.96 | 24.13 | 0.90 | 0.01 |
| 12 | 270 | 98.3 | 18.50 | 74.70 | 24.90 | 0.39 | 0.01 |

EXAMPLE 13

According to the process flow sheet in FIG. 1, 1 l of a $CuO-ZnO-Al_2O_3-B_2O_3$ catalyst (1:0.75:0.1:0.013 in atomic ratio preparation method A) was charged in the reactor (1), and 1.2 l of a $CuO-ZnO-Al_2O_3-NiO$ catalyst (1:1:0.5:0.5 in atomic ratio) was charged in the reactor (2) so as to reform methanol and to treat the condensed liquid, respectively. Then, reduction of the catalysts was carried out by use of steam containing 5 vol % of $H_2$ gas at 200° C. for 12 hrs. Next, methanol containing 0.08 wt % of ethanol was fed at a velocity of 78 g/h through the line (7) into the evaporator (4), and water was fed at a velocity of 439 g/h through the line (8) into the evaporator (4). The methanol-water mixed vapor generated was supplied into the reactor (1). The reactor (1) was operated at atmospheric pressure, 240° C., a vapor space velocity of 600 $h^{-1}$ and a water/methanol ratio of 10. As a result, 99.5% of methanol supplied was converted. The reformed gas taken out through the line (11) was 217.3 Nl/h in amount, with a composition of 75.02 vol % of $H_2$, 24.93 vol % of $CO_2$, 0.05 vol % of CO and traces of $CH_4$. The condensed liquid was introduced through the line (12) into the evaporator (5), and the vapor generated was supplied into the reactor (2). The reactor (2) was operated at atmospheric pressure, 250° C. and a vapor space velocity of 400 $h^{-1}$. Methanol, ethanol and high boiling point components were not substantially noted in the liquid discharged through the line (13).

COMPARATIVE EXAMPLE 6

According to the process flow sheet in FIG. 5, the operations were carried out in a manner similar to that in Example 13, except the condensed liquid was not treated. The condensed liquid discharged through the line (12) contained 0.1 wt % of unreacted methanol, 0.076 wt % of ethanol, 0.008 wt % of high boiling point components, and the rest being water.

EXAMPLE 14

According to the process flow sheet in FIG. 2, 1 l of a $CuO-ZnO-Cr_2O_3$ type methanol-reforming catalyst (1:0.5:0.5 in atomic ratio preparation method B) prepared according to the method in Japanese Patent Publication No. 49-37708 was charged into the reactor (1), and 67 ml of a $CuO-ZnO-Al_2O_3-NiO$ (1:1.5:0.7:1) catalyst for treating the condensed liquid was charged into the reactor (2). Methanol containing 0.0056 wt % of ethanol was used as the raw material. The reactor (1) was operated at a pressure of 30 kg/cm²G, a temperature of 400° C., a vapor space velocity of 5,013 $h^{-1}$ and a water/methanol molar ratio of 1.0, and the reactor (2) was operated at 20 kg/cm²G, 380° C. Then, the following results were obtained in a stationary state. When methanol was fed at a velocity of 3.59 kg/h through the line (7) and water was fed at a velocity of 2.02 kg/h through the line (8) and the vapor space velocity in the reactor (2) was controlled at 9,905 $h^{-1}$, the conversion of methanol supplied into the reactor (1) was 98.8%. The reformed gas generated amount to 9.29 Nm³/h, with a composition of 73.33 vol % of $H_2$, 20.00 vol % of $CO_2$, 6.66 vol % of CO and 0.01 vol % of $CH_4$. The wet gas discharged from the reactor (2) substantially contained no methanol, ethanol and high boiling point components.

COMPARATIVE EXAMPLE 7

According to the process in FIG. 6, the steam reforming reaction of methanol carried out in conditions completely similar to those in Example 14, except the condensed liquid was directly supplied into the reactor (1) with raw material methanol and water. In a stationary state, the conversion of methanol supplied into the reactor (1) was 79.8%. The reformed gas amounted to 7.34 Nm³/h, with a composition of 72.75 vol % of $H_2$, 21.03 vol % of $CO_2$, 6.21 vol % of CO and 0.01 vol % of $CH_4$. Also, the ethanol content in the condensed liquid was 0.111 wt %.

EXAMPLE 15

The operations were carried out in a manner similar to that in Example 13, except 2.8 l of a $CuO-ZnO-Al_2O_3-NiO$ (1:0.5:0.35:0.2 in atomic ratio) catalyst was used in the reactor (2), methanol containing 0.021 wt % of ethanol was used as the raw material, the reactor (1) was operated at 5 kg/cm²G, 280° C., a vapor space velocity of 10,112 $h^{-1}$ and a water/methanol molar ratio of 5.0, and the reactor (2) was operated at 15 kg/cm²G and 300° C. As a result, the conversion of methanol supplied into the reactor (1) was 96.9% in a stationary state at a methanol feed velocity of 2.41 kg/h, a water feed velocity of 1.36 kg/h and a vapor space velocity of 2,450 $h^{-1}$ in the reactor (2). The reformed gas amounted to 6.54 Nm³/h, with a composition of 75.02 vol % of $H_2$, 24.79 vol % of $CO_2$, 0.19 vol % of CO and traces of $CH_4$.

COMPARATIVE EXAMPLE 8

According to FIG. 6, the steam reforming reaction of methanol was carried out in conditions similar to those in Example 15 except the condensed liquid was directly supplied from gas-liquid separator (3) into the reactor (1) without treatment. The conversion of methanol supplied into the reactor (1) was 82.3%. The reformed gas amounted to 5.45 Nm³/h, with a composition of 74.57 vol % of $H_2$, 25.21 vol % of $CO_2$, 0.22 vol % of CO and traces of $CH_4$. Also, 0.085 wt % of ethanol remained in the condensed liquid.

What is claimed is:

1. A method for steam reforming methanol wherein the gas produced by the steam reforming reaction of methanol with water or by the steam reforming reaction of a mixture of methanol and a condensed liquid with water by gaseous phase reaction in the presence of catalysts is separated by cooling to form a reformed gas containing hydrogen and carbon dioxide and a condensed liquid containing water, methanol, ethanol and high boiling point organic components, characterized in that the condensed liquid is brought into contact with a catalyst containing (A) copper oxide, (B) an oxide of at least one type of metal selected from the group consisting of zinc, aluminum and chromium and (C) an oxide of a group VIII metal of the periodic table, whereby the methanol, ethanol and high boiling point organic components in the condensed liquid are decomposed to gaseous components, resulting in substantially pure water.

2. A method as claimed in claim 1, wherein said catalyst has a copper: zinc or chromium atomic ratio of 1:0.2-2.

3. A method as claimed in claim 1, wherein said catalyst has a copper: aluminium atomic ratio of 1:0.01-1.5.

4. A method as claimed in claim 1, wherein said catalyst has a copper: the group VIII metal (in the periodic table) atomic ratio of 1:0.01-3.

5. A method as claimed in claim 1, wherein said catalyst comprises copper oxide, zinc oxide, aluminum oxide and oxide of the group VIII metal in the periodic table.

6. A method as claimed in claim 1, wherein said catalyst comprises copper oxide, zinc oxide and oxide of the group VIII metal in the periodic table.

7. A method as claimed in claim 1, wherein said catalyst comprises copper oxide, zinc oxide, chromium oxide and oxide of the group VIII metal in the periodic table.

8. A method as claimed in claim 1, wherein the group VIII metal compound is oxide, hydroxide, ammonium salt, sulfate, carbonate, hydrochloride, nitrate phosphate, formate, acetate, oxalate or carbonyl compound of the group VIII metal.

9. A method as claimed in claim 1, 5, 6 or 7, wherein said oxide of the group VIII metal is nickel oxide, cobalt oxide, platinum oxide or palladium oxide.

10. A method as claimed in claim 1, wherein the gasified condensed liquid is brought into contact with the catalyst at 150°-600° C.

11. A method as claimed in claim 1, wherein the gasified condensed liquid is brought into contact with the catalyst at a pressure of 50 kg/cm$^2$G or less.

12. A method as claimed in claim 1, wherein the gasified condensed liquid was treated with the catalysts at a velocity of 50-50,000 h$^{-1}$.

13. A method as claimed in claim 1, wherein the gasified mixture comprising of 1 part by weight of the condensed liquid and 0.01-100 parts by weight of water is brought into contact with the catalyst.

14. A method as claimed in claim 1, wherein the catalyst is activated before use by reduction at 150°-400° C. in a reducing gas atmosphere.

15. In a method for steam reforming methanol wherein methanol or a mixture of methanol and a condensed liquid is steam reformed in the presence of a catalyst and the gas produced by the reaction is cooled to form a reformed gas comprising hydrogen and carbon dioxide and a condensed liquid comprising water, methanol, ethanol and high boiling point organic components, wherein the improvement comprises contacting said condensed liquid with a catalyst comprising (A) copper oxide, (B) at least one oxide of zinc, aluminum and chromium and (C) an oxide of a group VIII metal to decompose the methanol, ethanol and high boiling point organics to gaseous components resulting in substantially pure water.

* * * * *